Patented May 12, 1942

2,282,799

UNITED STATES PATENT OFFICE 2,282,799

STABILIZATION OF DAIRY PRODUCTS

Sidney Musher, New York, N. Y., assignor to Musher Foundation Incorporated, New York, N. Y., a corporation of New York No Drawing. Application March 12, 1942, Serial No. 434,390

7 Claims. (Cl. 99—151)

The present invention relates to the preparation of antioxygenic materials and it particularly relates to the preparation of strong antioxygenic compositions from cereals.

It has been found that antioxygenic materials may be extracted by water and/or alcohol from unbleached cereal flours, leaving a residue substantially devoid of antioxygenic materials, said extract capable of exerting an antioxygenic effect upon aqueous oxidizable compositions.

It has now been found that new and strongly effective antioxygenic materials may be obtained from cereals which may already have been subjected to water extraction where such cereals have been subjected to a sprouting and germinating operation until the germ has been substantially enlarged and germinated.

The germinated or sprouted cereal may be used for its enhanced and antioxygenic effect, or the water soluble extract of such germinated or sprouted cereal may be extracted with a slightly acidified water, and at a temperature between about 125° F. and 145° F. and which either before, during or after extraction is rendered substantially free of diastatic enzymes to obtain a product high in antioxygenic effectiveness and to have an enhanced effect particularly when subjected to elevated temperatures after addition to oxidizable compositions and particularly to glyceride oil containing aqueous dairy compositions.

It has been found that the best results are obtained from germinated or sprouted maize and oats and it is important that the cereal or its extract be produced or treated in such a way as either to kill or deactivate the diastatic enzyme which may have been produced during the germinating or sprouting process.

Where the extract is used, it is quite important that the extract after preparation from the germinated maize or oats be concentrated to between 40% and 75% total solids or more and it is desirable at some point during the evaporation process or before or after such evaporation for the extract to be heated to a temperature of at least about 190° F. in order to kill off the diastatic enzymes and also to render the product more sterile.

The temperature of extraction can be between 125° F. and 145° F. provided the diastase has already been killed off in the sprouted or germinated cereal. However, where there still remains any diastatic action in the germinated or sprouted cereal, the extraction should proceed for the shortest possible time such as for less than 30 minutes at a temperature of not in excess of about 115° F. and preferably at room temperature. It is, however, particularly desirable for the germinated or sprouted cereal to be heated in its moist condition to a temperature sufficiently high to inactivate the diastase and then to extract.

The preferred concentrated extract should contain less than about 60% of sugar against the total solids weight of the concentrated extract and preferably less than about 45%. It has been found that a high sugar content in the extract not only appears to reduce the antioxygenic effectiveness of the antioxidant materials present, but also the excessive enzyme action of the diastase in producing such large concentrations of sugar appears to be quite disadvantageous in obtaining a satisfactory antioxygenic effect and material.

In order to avoid these undesirable results, the starch content of the germinated or sprouted cereal should not be reduced by more than about 30% against the original amount of starch contained in the cereal before germination and diastatic action should be stopped or the extraction should take place before there is any further conversion of the starch into sugar.

Under these circumstances, the germinated or sprouted cereal will contain between about 35% and 50% or more total starch which should be permitted to remain in the cereal when used in accordance with the present invention or when prepared for the extraction procedure.

As an example of the method of preparing such diastase-free antioxygenic material from corn or maize, the whole corn is first soaked in water after sorting and cleaning for a period of about from 48 to 120 hours and at below room temperature.

The water is changed about every 12 to 20 hours in order to avoid any fermentation of the materials which are extracted from the ungerminated corn.

The first and/or second steep or soaking water, desirably in unfermented condition, which is removed from the ungerminated cereal may be evaporated or concentrated to produce an antioxygenic material to which, however, this invention is not particularly directed, the present invention being particularly directed to a novel antioxygenic material which is produced following the sprouting or germinating of the cereal and including the water soluble materials contained in the germinated cereals.

This soaking procedure is continued until the corn takes up about between 40% and 60% of its weight of water. The thoroughly soaked corn is then removed from the water and placed in layers as thick as, say, about 12 inches to 18 inches and permitted to germinate at a temperature of about 60° F. to 80° F. for a period of, say, from 5 to 10 days. During this period the thickness of the layers may be decreased to as little as 2 inches to 5 inches and the corn may be turned over from time to time in order to expose the individual grains of the corn to air. Moreover, during this period the corn may be kept moist by sprinkling water thereon.

This germinating process is continued until the sprout is from one-quarter to the full length of the corn kernel itself.

The sprouts of the sprouted or germinated corn or oats may, where desired, be removed by running the cereal over sieves to separte the sprouts from the remainder of the sprouted cereal. The resultant sprouted or germinated corn or oats may then be finely divided or air-separated in order to obtain a product in a fine state of division, and which may be used for addition to aqueous dairy compositions subject to oxidative deterioration to retard deterioration thereof.

The resultant sprouted or germinated corn may also be directly extracted after grinding into a fine state of division or such sprouted cereal may first be dried and even kiln dried to destroy a substantial part of the diastatic enzymes contained in the sprouted cereal before extraction.

It has been found that a greater proportion of the diastase is killed off by heating the germinated cereal while still moist to over about 180° F. and preferably to about 200° F. but care must be exercised that the starch contained in the germinated cereal is not gelatinized during this heating procedure.

In the preparation of the water extract, the substantially diastase-free sprouted or germinated cereal such as corn in a fine state of division is mixed or agitated thoroughly with a quantity of water for a period of about 30 minutes at a temperature of 135° F. The time of agitation may vary from 5 minutes to 1 hour but in order to obtain the maximum yield and the most desirable product, the time period for continuous agitation should be between about 30 minutes and 45 minutes.

The temperature of the water at the time of the extraction should not be in excess of about 140° F. to 145° F. in order to avoid conversion and gelatinization of the starch, both of which are undesirable in the production of the desired extract. The water temperature should also not be less than about 125° F. to 130° F., as a difference of as little as 10° in the temperature of the water used for extraction may account for a 30% to 60% loss in the yield of the water extract that is obtained.

The water used should be substantially free of minerals and desirably free of iron and copper. Where the water normally has a pH above 7.0, it should be acidified to reduce the pH. Preferably, in order to obtain a clear supernatant water containing the extract, and to obtain the most desirable type of extract, the pH of the water should be adjusted to between 4 and 7 and preferably to about 5 to 6 by addition of a mineral acid such as hydrochloric, sulphuric or phosphoric, or an organic acid such as acetic, tartaric, citric, etc., or by the addition of acid salts such as acid sulphates or phosphates. This adjustment may take place during or before the extraction. The pH adjustment will also serve to increase the rate at which insoluble material will settle out leaving a clear supernatant water portion containing the extract.

Any quantity of water may be used to produce a free flowing mixture. One part of corn should preferably be mixed with about 5 parts of water by weight. Other proportions may also be used such as from 4 to 15 parts of water to every 1 part of corn.

Another very satisfactory method is for the cereal to be ground or milled with sufficient water to produce a paste and whereby the cell structure of the cereal is so broken into as to permit the maximum solubility of the water extractable substances into the water. Then the pulpy aqueous mass may be pressed or centrifuged or otherwise treated to remove the aqueous solution containing the extract. Preferably the same temperature and acidity are employed as above. The solution may be clarified or filtered or where additional water is added, allowed to settle out.

Where the corn-water suspension is allowed to stand for settling out, and after the 30 minute agitation and extraction period, the solution should desirably be cooled by placing it in a jacketed or coiled vat or by running water through cooling coils immersed therein or by adding cold water to the hot corn-water suspension, so that the temperature of the water is reduced from 135° F. to from 80° F. to 105° F. and preferably to about 100° F. in order to avoid fermentation during the settling period. The solution thus cooled may then be treated to remove the undissolved starch, fibrous and other cereal insoluble portions. This may be accomplished by allowing the solution to settle for from 2 to 12 hours until a substantially clear unfermented supernatant liquid is formed which liquid is removed by decanting, siphoning, or similar process.

The solution containing the corn may also be subjected to a continuous centrifuging whereby all undissolved material is removed as a continuous operation.

The substantially clear solution thus obtained should desirably be evaporated by vacuum distillation at about 135° F. to approximately between 45% and 75% solids and desirably to about 70% solids and to a Baumé of 37°. After the proper solids content has been reached, the extract should desirably be subjected to superheated steam in the vacuum pan in order to raise the temperature of the extract to 200° F. for about 10 minutes in order to sterilize it and also retain its full stabilizing properties for longer periods.

The evaporating temperature may vary, dependent upon whether vacuum or atmospheric pressure is used. Although it is desirable to use vacuum evaporation, evaporation at atmospheric pressure may also be employed.

The concentrated extract may also be packed in cans or other containers and sterilized at 220° F. to 250° F. for 10 to 30 minutes.

Where, due to prolonged sterilization or high heat during such sterilization, a coagulation or precipitation is formed resulting in the production of insoluble matter, such precipitate may be filtered or otherwise removed. Distilled or softened water is desirable as the extracting medium and will avoid, to a large degree, such precipitation and coagulation.

It is not desirable to concentrate the water extract down to in excess of 75% solids in the vacuum pan, as otherwise darkening and caramelization of the extract occurs.

Where drying is desirable, the concentrated water extract may be dried on trays, preferably under vacuum and a desirable dried product will be obtained. Drum drying is difficult in view of the mucilaginous nature of the extract by means of which the extract adheres to the drum and cannot readily be scraped off. Spray drying may less preferably be resorted to in view of the oxidation occurring during the spray drying operation.

Where desired, a carrier may be employed in the drying of the concentrate. For example, the concentrated water extract may be mixed with condensed skim milk on the basis of using from 10% to 60% by weight of the extract (on its solids basis) against the solids weight of the skim milk and the thoroughly mixed combination of the concentrate and skim milk dried on a drum drier or otherwise dried. The skim milk absorbs the gummy characteristics of the concentrate and permits much easier drying than where the concentrate is dried alone. Other carriers may also be employed such as salt and sugar, for example, dependent upon the use to which the extract is eventually to be put.

The extract may very desirably be mixed with milk, preferably skimmed, in concentrated form, and using from 10% to 60% of the extract and 90% to 40% of the milk, based on the solids weight, and then drying the ingredients together, whereby there is obtained a combined action of the milk ingredients with the extract to further increase the stabilizing action of the extract. The drying may be done preferably on a hot roll and the dried film scraped off after drying. Less preferably the mixture may be dried by spraying into a heated chamber.

The extract may also be mixed with powdered or crystallized salt or sugar using from 1% to 20% of the extract and 90% to 80% of the salt or sugar and preferably applying the concentrated extract to the sugar or salt crystals by spraying such extract on the crystals while they are kept at above 180° F. and desirably at between 250° F. and 300° F. so that the extract dries on the surface of the crystals of the salt or sugar.

For example, as the salt crystals leave the kiln at 275° F., the extract containing 30% water may be heated to 170° F. and sprayed on the salt crystals, applying 2% on the solids basis to the salt in this manner, thereby obtaining a completely soluble product. The extract may be applied to sugar such as to refined cane or beet sugar or to dextrose at the centrifugals to obtain complete admixture with and absorption upon the sugar crystals. In all cases the final extract should be free of starch and cereal fibres.

The germinated or sprouted cereal, preferably in finely divided form, or its concentrated sprouted cereal extract obtained in accordance with this invention has wide antioxygenic properties and may particularly be used for the preservation of dairy compositions subject to oxidative deterioration and particularly of oxidizable glyceride oil containing aqueous dairy compositions.

For example, the germinated cereal or its extract may also be desirably utilized in the dairy industry and particularly for addition to cream before pasteurizing and where the cream is then churned to produce butter, the butter being substantially free of the added cereal or its extract but nevertheless improved in keeping quality and stabilized against oxidative deterioration. When added to cream, the cereal or its extract is used in an amount of between 0.1% and 1% against the butterfat weight of the cream and is preferably added to the cream before the cream is pasteurized and churned.

The germinated or sprouted cereal or its extract may also be used to retard oxidative deterioration of the fruit ice cream and particularly of strawberry ice cream where the extract is added to the ice cream before pasteurizing in an amount of between 0.02% and 0.5% and thoroughly admixed therein.

The germinated or sprouted cereal or its extract may also be utilized for addition to milk subject to oxidation as well as to cream used in the preparation of cream cheese, cream for storage, cheese compositions including cheddar cheese, milk for powdering, both whole and skim, as well as to condensed milk, sweetened condensed milk, evaporated milk and similar aqueous dairy compositions subject to oxidative deterioration.

Less than 5% of the germinated or sprouted cereal or its extract on its solids basis against the weight of the oxidizable dairy composition will generally give the desired preservative effect and in most instances less than 2% will be sufficient. The cereal or its extract should desirably be thoroughly dispersed throughout the body of the dairy composition to be stabilized.

It has been particularly found that where the extract of the germinated or sprouted cereal is added to a dairy material subject to oxidation and that dairy material containing the extract thoroughly dispersed therein subjected to an elevated temperature in excess of about 170° F. and desirably to about 250° F. or above, a marked acceleration or increase in preservative effect will be obtained.

For example, the extract may be added to cream which is then heated to about 180° F. and churned to produce butter.

It is not known as to exactly how the antioxygenic effect is enhanced as a result of the elevated temperature treatment or whether the effect is due to chemical or catalytic action.

Where desired, the grain may be fortified before sprouting or germinating with a small quantity of a nutrient such as yeast, organic phosphates, etc.

Although corn and oats are given as the preferred examples, it is also possible to use other germinated and sprouted cereals as well as their substantially diastase-free extracts such as of sprouted or germinated wheat, rye and barley.

It is possible to obtain a combined antioxygenic concentrate by combining together the first and/or second steep water or soaking water used for the first steeping or soaking of the cereal before the germinating process has been completed with the substantially diastase-free extract of the germinated cereal produced in accordance with this invention and then to concentrate the combined extract or to mix such concentrated extracts in order to obtain an effective antioxygenic material.

The germinated or sprouted cereals or either one or both of these extracts may after concentration be mixed with fully water miscible or partly water miscible organic solvents such as, for example, acetone or the alcohols, such as methanol, iso-propyl alcohol or butyl alcohol, in order to enhance the antioxygenic effect. If desired, it is also possible, although less preferable, to use a mixture of water and these organic solvents as extracting agents, preferably in slightly acidified condition. Or, on the other hand, the organic solvents themselves may be utilized as the extractant following which they may be evaporated to obtain the concentrate or mixed with water to precipitate therefrom materials not desired in the final antioxygenic concentrate.

There may also be utilized together with or in lieu of the sprouted or germinated cereals, the sprouted or germinated cereal germs such as wheat germ, oat germ, rice germ, and corn germ, which may contain a small quantity of the endosperm or other nutrient to be supplied to the germ during the sprouting or germinating operation. The extract of the sprouted or germinated germ prepared in this manner may be concentrated and utilized as an antioxidant for organic oxidizable compositions. Desirably, slightly acidified water and alcohol are employed as the solvents during the extraction procedure.

The seeds, such as soya, sesame and peanuts, and particularly the seed germs such as peanut germ may also be permitted to sprout and germinate and then utilized in accordance with the present invention for enhanced antioxygenic effect.

The present application is a continuation in part of application, Serial No. 306,325 filed November 27, 1939, and through said application continues the applications which matured into Patents 2,232,555 and 2,181,765.

The parent application, Serial No. 306,325 is directed to the stabilization of food compositions, and particularly glyceride oil food compositions, whereas the present application is directed particularly to the stabilization of aqueous dairy compositions such as milk and cream.

Having described my invention, what I claim is:

1. A method of treating dairy compositions subject to oxidative deterioration to stabilize them against such deterioration, which comprises adding thereto a relatively small amount of a product selected from the group consisting of the finely divided sprouted and germinated cereals, sprouted and germinated cereal germs, sprouted and germinated seeds, and their water and alcohol soluble extracts.

2. A method of treating aqueous dairy compositions subject to oxidative deterioration to stabilize them against such deterioration, which comprises adding thereto a relatively small amount of a sprouted and germinated cereal.

3. A method of treating ice cream subject to oxidative deterioration to stabilize it against such deterioration, which comprises adding thereto a relatively small amount of a sprouted and germinated cereal.

4. A method of preparing dairy butter stabilized against oxidative deterioration, which comprises adding to cream a relatively small proportion of a product selected from the group consisting of the finely divided sprouted and germinated cereals, sprouted and germinated cereal germs, sprouted and germinated seeds, and their water and alcohol soluble extracts, and then churning to form butter, the butter being substantially free of the added material.

5. A dairy composition stabilized against oxidative deterioration, said dairy composition containing a small amount of a product selected from the group consisting of the finely divided sprouted and germinated cereals, sprouted and germinated cereal germs, sprouted and germinated seeds, and their water and alcohol soluble extracts as the stabilizing agent.

6. An aqueous dairy composition stabilized against oxidative deterioration, said dairy composition containing a small amount of a sprouted and germinated cereal as the stabilizing agent.

7. An ice cream stabilized against oxidative deterioration, said ice cream containing a small amount of a sprouted and germinated cereal as the stabilizing agent.

SIDNEY MUSHER.